US010474687B2

(12) United States Patent
Shapira

(10) Patent No.: US 10,474,687 B2
(45) Date of Patent: *Nov. 12, 2019

(54) SYSTEM AND METHOD OF AGGREGATING NETWORKED SOCIAL CONTENT AND FACILITATING UNCAPPED ENGAGEMENT IN A NETWORKED VIRTUAL ENVIRONMENT

(71) Applicant: EscapeX Limited, Kowloon (HK)

(72) Inventor: Sephi Joseph Shapira, Hasavim (IL)

(73) Assignee: ESCAPEX LIMITED, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,972

(22) Filed: Dec. 5, 2016

(65) Prior Publication Data

US 2017/0344557 A1  Nov. 30, 2017

Related U.S. Application Data

(63) Continuation of application No. 15/165,756, filed on May 26, 2016, now Pat. No. 9,519,690.

(51) Int. Cl.
| | |
|---|---|
| *G06F 16/9535* | (2019.01) |
| *G06F 16/2457* | (2019.01) |
| *G06F 3/0482* | (2013.01) |
| *G06F 16/248* | (2019.01) |
| *G06Q 50/00* | (2012.01) |

(52) U.S. Cl.
CPC ...... *G06F 16/24578* (2019.01); *G06F 3/0482* (2013.01); *G06F 16/248* (2019.01); *G06F 16/9535* (2019.01); *G06Q 50/01* (2013.01)

(58) Field of Classification Search
CPC .................................. G06F 17/30867
See application file for complete search history.

(56) References Cited

U.S. PATENT DOCUMENTS

| | | | |
|---|---|---|---|
| 9,331,973 | B1 | 5/2016 | Kristinsson |
| 2004/0093615 | A1 | 5/2004 | Boston |
| 2010/0312702 | A1 | 12/2010 | Bullock |
| 2012/0166453 | A1 | 6/2012 | Broder |
| 2014/0244560 | A1 | 8/2014 | Mohanty |
| 2015/0234844 | A1 | 8/2015 | Cardonha |
| 2015/0248222 | A1 | 9/2015 | Stickler |

FOREIGN PATENT DOCUMENTS

CN   101425093 A   5/2009

OTHER PUBLICATIONS

"YouNow: Live Stream Video Chat—Android Apps on Google Play", printed from <https://play.google.com/store/apps/details?id=younow.live&hl=en[Jul. 14, 2016 2:45:18 PM]>, copyright 2016 Google, 2 pages.

*Primary Examiner* — Kris E Mackes
(74) *Attorney, Agent, or Firm* — Hean L. Koo; Mannava & Kang, P.C.

(57) ABSTRACT

A system and method is disclosed for aggregating networked content, and allowing user to obtain an unlimited number of engagements relating to networked content. The system may publish a ranking of users based on the number of engagements obtained by the users. Such ranking may facilitate highlighting or otherwise setting apart those users who have obtained more engagements relating to content, thereby allowing a user or user's content to be noticed by others, even among a vast number of networked content that is available.

24 Claims, 6 Drawing Sheets

SYSTEM AND METHOD OF AGGREGATING NETWORKED SOCIAL CONTENT AND FACILITATING UNCAPPED ENGAGEMENT IN A NETWORKED VIRTUAL ENVIRONMENT

CROSS-REFERENCE TO RELATED APPLICATIONS

This application is a continuation of U.S. patent application Ser. No. 15/165,756, filed May 26, 2016 entitled "SYSTEM AND METHOD OF AGGREGATING NETWORKED SOCIAL CONTENT AND FACILITATING UNCAPPED ENGAGEMENT IN A NETWORKED VIRTUAL ENVIRONMENT", the entirety of which is incorporated herein by reference.

FIELD OF THE INVENTION

The invention relates to a system and method of aggregating networked social content and facilitating uncapped engagement in a networked virtual environment in exchange for user resources.

BACKGROUND OF THE INVENTION

With the vast amount of content available through networked virtual environments, such as through various networked content sites (e.g., social media platforms), it is difficult for a user to get noticed or otherwise be distinguished from other users. For instance, conventional systems that allow users to express interest in a topic are more content-centric rather than user-centric. For instance, using the Facebook® platform, although a user may indicate an interest in a given topic using the "like" feature, this mechanism aims to assess an overall (user-wide) interest level in the content being liked, but does not distinguish one user who likes the content from another user because each user is generally limited to a single "like." The same is true for conventional comment assessments in which a user may vote up or down a given comment or other content item. Conventional systems fail to provide mechanisms through which a given user is able to get noticed by or otherwise be distinguished from other users.

These and other drawbacks exist with conventional social platforms.

SUMMARY OF THE INVENTION

The invention addressing these and other drawbacks relates to a system and method of aggregating networked social content and facilitating uncapped engagement in a networked virtual environment.

Aggregating Networked Content

The system may aggregate networked content (e.g., content that is made available to users via a network) and display the content via a user interface. The content may include a post that includes content from a user, a user comment on a post, a user reply to a comment, and/or other type of content accessible to the system. For example, the system may obtain social media content items from a system-maintained social platform and/or from third party social media platforms, and display a listing of the social media content items. For each social media content item (or other type of aggregated content), the system may provide options, through the user interface, for a user to promote herself with respect to the social media content item.

Exchanging Resources for Engagements

The system may provide engagements in exchange for user resources. The user resources may include system-provided resources (e.g., virtual currency) or other types of resources (e.g., real currency such as fiat money, commodity money, digital currency, etc.). So long as the user has sufficient resources, the user may promote herself or others with uncapped (i.e., unlimited) engagements, which may facilitate getting noticed by other users, whether with respect to a social media content item that the user created or a social media content item that another user has created.

In implementations in which the system exchanges system-provided resources for engagements, the system may allocate the system-provided resources in various ways. For instance, the system may monitor user activity with respect to the system and award system-provided resources based on the user activity, allocate system-provided resources in exchange for payment of real currency, and/or allocate system-provided resources gifted from another user.

The options to engage may include, for example, a single engagement option, a multi engagement option, an objective-based engagement option, a maximum available engagement option, a collaboration engagement option, an algorithmic engagement option, a donation engagement option, and/or other engagement options to opt to engage.

A single engagement option may include an option to engage one time (in exchange for an amount of resources for the single engagement). A multi engagement option may include an option to engage a number of times greater than one (in exchange for an amount of resources for the multi engagement, which may be an integer multiple of the cost of a single engagement or be offered at a discount). An objective-based engagement option may include an option to engage to achieve an objective (such as engage to become a top N user). A maximum available engagement option may include an option to engage using whatever available resources the user may have. A collaboration engagement option may include an option to collaborate with one or more other users to collectively engage with the other users. An algorithmic engagement option may enable the user to specify conditions on which to automatically engage. An algorithmic engagement may include one in which instructions to engage in exchange for resources is previously defined by a user (or the system on behalf of the user). For instance, the user may specify that he wishes to maintain at least a top 3 ranking with respect to engagements. The system may store the specified instructions and automatically obtain engagements for the user (even when the user is offline, for example) in order to maintain the top 3 ranking for the user (or otherwise carry out the specified instructions). In this manner, the user need not stay online or otherwise continuously monitor social media or other content in order to maintain a top 3 ranking. Instead, the user may (even while offline or otherwise not himself monitoring the rankings) continue to exchange user resources for engagements in order to maintain his top 3 ranking (or other ranking) based on an algorithmic engagement option.

Publishing Engagements

The system may track the engagements from the user, as well as engagements from other users. For example, the system may count the number of engagements made by each user with respect to a social media content item, and provide engagement information indicating these numbers in association with the social media content item. For instance, the user interface may include the engagement information with or otherwise adjacent to the social media content item. Doing so may serve multiple purposes.

For example, publishing the engagement information may publicize a given user's engagements to other users, which may not only facilitate the given user being noticed by other users, but also spur competition among the users to achieve higher numbers of engagements. Publishing the engagement information may also indicate a level of user interest in a given social media content item in an uncapped manner. Thus, a given user who expends more resources to engage with respect to a given social media content item may not only get noticed by other users (including by the posting user who posted the social media content item if the posting user is different than the given user), but also express a level of interest in the given social media content item.

In some instances, the system may rank users according to their engagements. Such ranking may be performed per-social media content item and/or aggregated by user and be included with the engagement information. For example, for a given social media content item, the system may display the top N users who engaged the given social media content item the highest number of times.

In some instances, a user who engaged may provide a response to the relevant social media content item. For example, the user may provide a comment to a social media content item. The system may highlight the comment (to distinguish the comment from other user comments) based on the number of engagements by the user. For instance, if a user engaged in relation to a given social media content item, and commented on the given social media content item, the system may highlight the comment based on the number of engagements made by the user. Such highlighting may include, without limitation, placing the comment at the bottom (or top or other prominent position) of the listing of comments, graphically representing the comment differently than other comments (e.g., enhanced font size, different color, etc.), and/or otherwise distinguishing the comment from other comments. In this manner, not only will the user who engaged get noticed generally, but her comments may be made more prominent as well.

In some instances, the system may highlight the top N comments on a continuous basis such that the top N comments are updated in real-time. A top N comment is one in which a user who created the comment is in the top N list of users who engaged.

Collaborative Engagements

In some instances, the system may facilitate collaborative engagement. For instance, the system may group two or more users who may collectively use their resources to engage on a social platform. In these instances, the collaborative group may be collectively represented as a top N user, and their comments may be collectively or individually treated as a top N comment. In this manner, a group of users may pool their resources in order to become noticed by other users. This may encourage and facilitate teams of users who may compete to provide engagements. The system may, in some implementations, limit the number of users who may participate in a group (or may allow an unlimited number of users to participate in a group).

In some implementations, the system may match two or more users to participate in a group by request and/or automatically. The system may match two or more users by request when such users (or at least one of the users) request such matching by providing the system with an identification of user(s) with which to match.

In some implementations, the system may match two or more users automatically responsive to user requests to match with another user (without providing an identity of another user with which to match) or may be recommended by the system without a user identification of the other user(s). In these implementations, the system may identify other users with whom the user may collaborate to perform engagements. Such matching may be based on common user interests, patterns of user engagements (e.g., a user may be matched with another user based on their respective numbers, frequency of engagements, etc.).

Encouraging Engagements

In some implementations, the system may encourage users to engage. For example, and without limitation, the system may offer rewards to users (e.g., top N users) who engage. The rewards may include, without limitation, a reward offered by a user (e.g., a celebrity) who posted a social media content item (that is subsequently commented on and/or is the subject of an engagement by other users), a reward offered by the system (e.g., a resource), and/or other reward. In some instances, the system may receive a message from a user who posted a social media content item that encourages other users to engage. For example, the user who posted the social media content item may include a celebrity that encourages fans (other users) to engage via the social media content item.

Donating Engagements

In some implementations, a first user may donate a engagement to a second user. In this sense, the first user may "engage" the second user on behalf of the second user. This is distinguished from a collaborative engagement because the first user will not be grouped with the second user. In some of these instances, the system may maintain a history engagements made on behalf of other users and may highlight users who promote on behalf of others.

Engagement Analytics and Recommendations

In some implementations, the system may analyze engagements of users. Such analytics may be used to provide recommendations to users. For instance, the system may analyze engagements of a given user and determine that the user has not engaged within the last two weeks (or other time period) when the user historically engaged every week. In this instance, the system may generate an alert to encourage the user to engage. In some instances, the system may analyze content items and recommend one or more content items on which the user may wish to engage, based on historical engagements of the user (or like-minded users).

In some implementations, the system may track various analytics such as, without limitation, users that replied to a given user, users that engaged a given user, users that mentioned or commented on a given user, users who replied to a given user, indications of a frequency of user interest in a given user's post (e.g., every N items, other users click on "more" to obtain details of a given post), and/or other statistics.

The system may be implemented in various contexts. For example, and without limitation, the system may be employed using entity-specific (e.g., celebrity, artist, etc.) applications, such as entity-specific applications described in U.S. patent application Ser. No. 14/519,125, filed Oct. 20, 2014, entitled "System and Method of Creating and Managing Entity-specific Applications in an Integrated Platform," which is hereby incorporated by reference herein in its entirety. Alternatively or additionally, the system may be integrated with social media platforms, forums, blogs, and/or other platforms in which users may generally engage with other users in a virtual environment.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention relates to a system and method of aggregating networked social content and facilitating uncapped engagement in a networked virtual environment. A networked virtual environment refers to an environment in which content may be exchanged, shared, or otherwise published between different users over a network. Such a networked virtual environment may include, for example, mobile devices that facilitate content sharing or publishing, social media platforms (which may be accessed by mobile devices and other platforms), and/or other component configured to provide content to users over a network.

A user engagement with content refers to an indication that a user should be distinguished with respect to the content over another user. Such engagement may indicate an interest in the content or may simply indicate that the user wishes to be distinguished with respect to the content from other users (e.g., other users who may have not engaged with the content or have engaged less with the content than the user). As will be described below, each engagement may be awarded in exchange for user resources and may be graphically represented alongside the content (and/or in other user interfaces). In this manner, a first user who has more engagements than a second user may be differentiated by the system over the second user and may therefore be noticed by other users more so than the second user. Uncapped engagements refer to an ability by a given user to engage with content an unlimited number of times, so long as a requisite number or amount of user resources is exchanged for the engagements.

Figure 1:
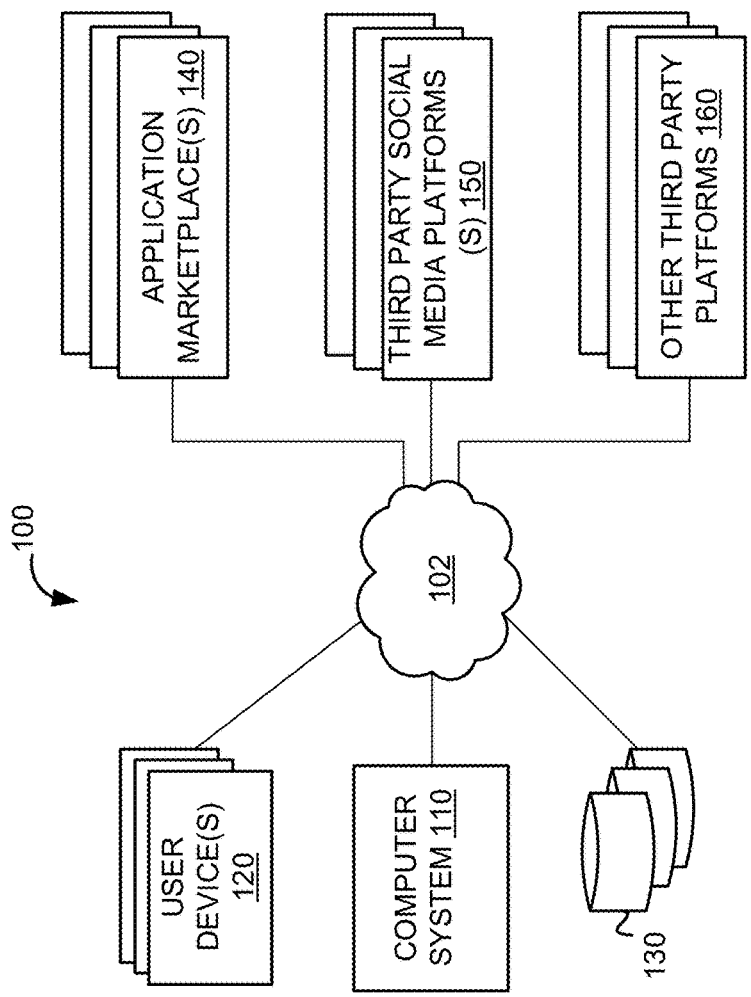
FIG. 1 illustrates an exemplary system for aggregating networked social content and facilitating uncapped engagement in a networked virtual environment, according to an implementation of the invention.

FIG. 1 illustrates an exemplary system 100 for aggregating networked social content and facilitating uncapped engagement in a networked virtual environment, according to an implementation of the invention. System 100 may include a computer system 110, one or more user devices 120, one or more databases 130, one or more application marketplaces 140, one or more third party social media platforms 150, other third party platforms 160, and/or other system components. The system components may be coupled to one another via a network 102.

Computer System 110

Computer system 110 may communicate with various user devices 120. Computer system 110 may obtain indications of engagements with content from such user devices and store and publish the engagements as described herein with respect to engagement module 210 (illustrated in FIG. 2).

User Device 120

Figure 2:
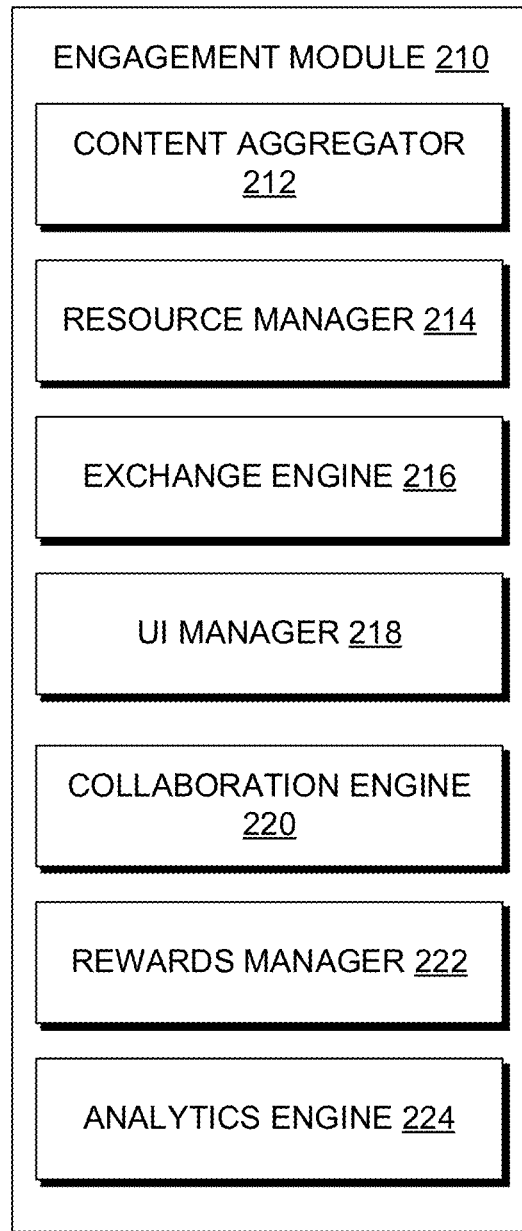
FIG. 2 illustrates an exemplary response module for aggregating networked social content and facilitating uncapped engagement in a networked virtual environment, according to an implementation of the invention.

User device 120 may provide interfaces for displaying content aggregated from various content platforms and facilitate user engagements with the content, as described herein with respect to engagement module 210 (illustrated in FIG. 2). In some implementations, aspects of the engagement module 210 (e.g., portions of the engagement module that programs user device 120) may be implemented as a mobile application. For example, the mobile application may be an entity-specific application, as described in U.S. patent application Ser. No. 14/519,125, filed Oct. 20, 2014, entitled "System and Method of Creating and Managing Entity-specific Applications in an Integrated Platform," which has been previously incorporated by reference.

User device 120 may provide one or more user interfaces that collectively provide interfaces through which the aggregated content is presented, along with options to obtain engagements with the content, and publications of such engagements. The one or more user interfaces may also include, for instance, a media player that plays music, videos, etc., a social media browser that displays social media content aggregated from various social media platforms (which may be integrated into a single display or separately navigable displays that each is displays social media content from a corresponding social media provider), a loyalty display that displays loyalty items, a fan board display, a network—e.g., Internet—browser that can monitor and display previous visit histories, and/or other displays to provide artist content described herein.

A user device 120 may be associated with a user (e.g., an owner or possessor of the user device). Such association may be based on a registration of the user device 120 (e.g., a unique device identifier) with a user identifier. Alternatively or additionally, such association may be based on a mobile application executing on the user device (in implementations in which the user device is a mobile device such as a smartphone, tablet, etc.). The mobile application may be registered for use by a user of the user device.

System Databases 130

In an implementation, computer system 110, user device 120, and/or other system components may access one or more database(s) 130 configured to store information generated, accessed, or otherwise maintained by the system and described herein (e.g., engagements, user profiles, user accounts that indicate user resources, etc.).

Application Marketplace 140

Application marketplace 140 may include application markets that make available for download engagement module 210 (or portions thereof) for integration into a user device 120. For example, application marketplace 140 may include, without limitation, the GOOGLE PLAY store, APPLE APP store, WINDOWS PHONE store, BLACKBERRY WORLD, and/or other application markets. System 100 may make engagement module 210 (or portions thereof) available for download from an application marketplace 140. Alternatively or additionally, system 100 may make engagement module 210 (or portions thereof) available for download from other sources, such as directly from computer system 110.

Social Media Providers 150

Social media providers 150 may include, for example, social media platforms (e.g., FACEBOOK, TWITTER, INSTAGRAM, FLICKR, YOUTUBE, etc.), and/or other providers that generally distribute content uploaded by users to be consumed by other users. The content may be generated by content sources such as individuals, corporations, and/or other entities that may create content. Users may post social media content to one or more social media providers 150, from which system 100 may aggregate and facilitate uncapped engagement as described herein.

FIG. 2 illustrates an exemplary engagement module 210 for aggregating networked social content and facilitating uncapped engagement in a networked virtual environment, according to an implementation of the invention. Engagement module 210 may include various instructions such as, without limitation, a content aggregator 212, a resource manager 214, an exchange engine 216, a User Interface ("UI") manager 218, a collaboration engine 220, a rewards manager 222, an analytics engine 224, and/or other instructions. Some or all of the instructions of engagement module 210 may program computer system 110 and/or user device 120 to perform one or more operations described herein. As used herein, for convenience, the various instructions will be described as performing an operation, when, in fact, the various instructions program the computer system 110 and/or user device 120 to perform the operation. In other words, computer system 110 and user device 120 may be programmed to perform the operations described herein.

In some implementations, content aggregator 212 may aggregate networked content (e.g., content that is made available to users via a network) and display the content via a user interface. The content may include a post that includes content from a user, a user comment on a post, a user reply to a comment, and/or other type of content accessible to the system. For example, content aggregator 212 may obtain social media content items from a system-maintained social platform and/or from third party social media platforms, and display a listing of the social media content items. For each social media content item (or other type of aggregated content), the system may provide options, through the user interface, for a user to promote herself with respect to the social media content item.

In some implementations, resource manager 214 may maintain resources available to a user. For example, resource manager 214 may maintain a user account database (e.g., a database 130) that tracks resources available to a given user. A user resource may include a system-provided resource (e.g., virtual currency) or other types of resources (e.g., real currency such as fiat money, commodity money, digital currency, etc.). A user may acquire resources in various ways such as, without limitation, purchasing a resource using real currency, earning resources by performing certain actions with respect to the system, receiving resources from another user (e.g., as a donation or gift), and/or other ways.

In a particular example, resource manager 214 may allocate the system-provided resources in various ways. For instance, exchange engine 216 may monitor user activity with respect to the system and award system-provided resources based on the user activity, allocate system-provided resources in exchange for payment of real currency, and/or allocate system-provided resources gifted from another user.

In some implementations, exchange engine 216 may provide engagements in exchange for user resources. So long as the user has sufficient resources, the user may promote (i.e., publicize) herself or others with uncapped (i.e., unlimited) engagements, which may facilitate getting noticed by other users, whether with respect to a social media content item that the user created or a social media content item that another user has created. Various amounts of user resources may be required to obtain an engagement. In a particular example, ten units of a virtual currency (which may be earned, purchased, or received as a gift or donation) may be required to obtain a single engagement. Users may be ranked relative to other users based on the number of engagements each user has obtained for a given content item.

The options to engage may include, for example, a single engagement option, a multi engagement option, an objective-based engagement option, a maximum available engagement option, a collaboration engagement option, an algorithmic engagement option, a donation engagement option, and/or other engagement options to opt to engage.

A single engagement option may include an option to engage one time (in exchange for an amount of resources for the single engagement). A multi engagement option may include an option to engage a number of times greater than one (in exchange for an amount of resources for the multi engagement, which may be an integer multiple of the cost of a single engagement or be offered at a discount). An objective-based engagement option may include an option to engage to achieve an objective (such as engage to become a top N user). A maximum available engagement option may include an option to engage using whatever available resources the user may have. In some instances, a user may have some remaining resources after having applied a maximum available engagement option. For example, if an engagement must be obtained in exchange for 10 units of resources, and the user has 67 units of resources, the system may provide the user with 6 engagements in exchange for 60 units of resources, and the user may have 7 units of resources remaining.

A collaboration engagement option may include an option to collaborate with one or more other users to collectively engage with the other users. An algorithmic engagement option may enable the user to specify conditions on which to automatically engage. An algorithmic engagement may include one in which instructions to engage in exchange for resources is previously defined by a user (or the system on behalf of the user). For instance, the user may specify that he wishes to maintain at least a top 3 ranking with respect to engagements. The system may store the specified instructions and automatically obtain engagements for the user (even when the user is offline, for example) in order to maintain the top 3 ranking for the user (or otherwise carry out the specified instructions). In this manner, the user need not stay online or otherwise continuously monitor social media or other content in order to maintain a top 3 ranking. Instead, the user may (even while offline or otherwise not himself monitoring the rankings) continue to exchange user resources for engagements in order to maintain his top 3 ranking (or other ranking) based on an algorithmic engagement option. Such algorithmic engagement options may be defined by a user and stored by the system in one or more user profiles. Such profiles may be stored in a profile database, such as a database 130.

In some implementations, the donation engagement option may allow a first user to donate an engagement to (e.g., engage on behalf of or otherwise provide resources for) a second user. In this sense, the first user may "engage" the second user on behalf of the second user. This is distinguished from a collaborative engagement because the first user will not be grouped with the second user. In some of these instances, exchange engine 216 may maintain a history engagements made on behalf of other users and may highlight users who promote on behalf of others.

In some implementations, the system may track (and UI manager 218 may publish) the engagements from the user, as well as engagements from other users. For example, the system may count the number of engagements made by each user with respect to a social media content item, and provide engagement information indicating these numbers in association with the social media content item. For instance, UI manager 218 may generate a user interface that includes the engagement information with or otherwise adjacent to the social media content item. Examples of user interfaces are illustrated in FIGS. 4-7. Doing so may serve multiple purposes.

For example, publishing the engagement information may publicize a given user's engagements to other users, which may not only facilitate the given user being noticed by other users, but also spur competition among the users to achieve higher numbers of engagements. Publishing the engagement information may also indicate a level of user interest in a given social media content item in an uncapped manner. Thus, a given user who expends more resources to engage with respect to a given social media content item may not only get noticed by other users (including by the posting user who posted the social media content item if the posting user is different than the given user), but also express a level of interest in the given social media content item.

In some instances, exchange engine 216 may rank users according to their engagements. Such ranking may be performed per-social media content item and/or aggregated by user and be included with the engagement information. For example, for a given social media content item, the system may display the top N users who engaged the given social media content item the highest number of times.

In some implementations, exchange engine 216 may identify new posts that are available for engagement and provide an alert to a user that a new post is available. In this manner, the user may be informed of such new posts even if the user is not logged into the system (e.g., while offline or otherwise not actively using an application that provides access to the functions of the system). In some of these implementations, the alert may provide options for the user to obtain an engagement, such as, without limitation: an option to activate a mobile application to engage with the content, an option to obtain an engagement relating to the content without activating a user interface of the mobile application (e.g., obtain an engagement relating to the content directly from the alert—which may be configured as a drop-down notification—rather than from a user interface of the mobile application), and/or other options to obtain an engagement related to the content.

In this manner, the system facilitates improved operation of a user device 120 (e.g., a mobile device programmed with a mobile application) in that at least some interfaces of the mobile application, in some instances, need not be activated in order to obtain engagements, as well as to facilitate engagements even when the user is offline or otherwise not actively using the mobile application. In some implementations, exchange engine 216 may identify a new post and automatically obtain, on behalf of a user, a certain number of engagements, in accordance with instructions from an algorithmic engagement option.

In some instances, a user who engaged may provide a response to the relevant social media content item. For example, the user may provide a comment to a social media content item. UI manager 218 may highlight the comment (to distinguish the comment from other user comments) based on the number of engagements by the user. For instance, if a user engaged in relation to a given social media content item, and commented on the given social media content item, UI manager 218 may highlight the comment based on the number of engagements made by the user. Such highlighting may include, without limitation, placing the comment at the bottom (or top or other prominent position) of the listing of comments, graphically representing the comment differently than other comments (e.g., enhanced font size, different color, etc.), and/or otherwise distinguishing the comment from other comments. In this manner, not only will the user who engaged get noticed generally, but her comments may be made more prominent as well.

In some instances, UI manager 218 may highlight the top N comments on a continuous basis such that the top N comments are updated in real-time. A top N comment is one in which a user who created the comment is in the top N list of users who engaged the most (e.g., obtained the top N most engagements in exchange for user resources).

In some implementations, collaboration engine 220 may facilitate collaborative engagement. For instance, collaboration engine 220 may group two or more users who may collectively use their resources to engage on a social platform. In these instances, the collaborative group may be collectively represented as a top N user, and their comments may be collectively or individually treated as a top N comment. In this manner, a group of users may pool their resources in order to become noticed by other users. This may encourage and facilitate teams of users who may compete to provide engagements. Collaboration engine 220 may, in some implementations, limit the number of users who may participate in a group (or may allow an unlimited number of users to participate in a group).

In some implementations, collaboration engine 220 may match two or more users to participate in a group by request and/or automatically. Collaboration engine 220 may match two or more users by request when such users (or at least one of the users) request such matching by providing collaboration engine 220 with an identification of user(s) with which to match.

In some implementations, collaboration engine 220 may match two or more users automatically responsive to user requests to match with another user (without providing an identity of another user with which to match) or may be recommended by collaboration engine 220 without a user identification of the other user(s). In these implementations, collaboration engine 220 may identify other users with whom the user may collaborate to perform engagements. Such matching may be based on common user interests, patterns of user engagements (e.g., a user may be matched with another user based on their respective numbers, frequency of engagements, etc.).

In some implementations, rewards manager 222 may encourage users to engage. For example, and without limitation, rewards manager 222 may offer rewards to users (e.g., top N users) who engage. The rewards may include, without limitation, a reward offered by a user (e.g., a celebrity) who posted a social media content item (that is subsequently commented on and/or is the subject of an engagement by other users), a reward offered by the system (e.g., a resource), and/or other reward. In some instances, rewards manager 222 may receive a message from a user who posted a social media content item that encourages other users to engage. For example, the user who posted the social media content item may include a celebrity that encourages fans (other users) to engage via the social media content item.

In some implementations, analytics engine 224 may analyze engagements of users. Such analytics may be used to provide recommendations to users. For instance, analytics engine 224 may analyze engagements of a given user and determine that the user has not engaged within the last two weeks (or other time period) when the user historically engaged every week. In this instance, the system may generate an alert to encourage the user to engage. In some instances, analytics engine 224 may analyze content items and recommend one or more content items on which the user may wish to engage, based on historical engagements of the user (or like-minded users).

In some implementations, analytics engine 224 may track various analytics such as, without limitation, users that replied to a given user, users that engaged a given user, users that mentioned or commented on a given user, users who replied to a given user, indications of a frequency of user interest in a given user's post (e.g., every N items, other users click on "more" to obtain details of a given post), and/or other statistics.

Figure 3:
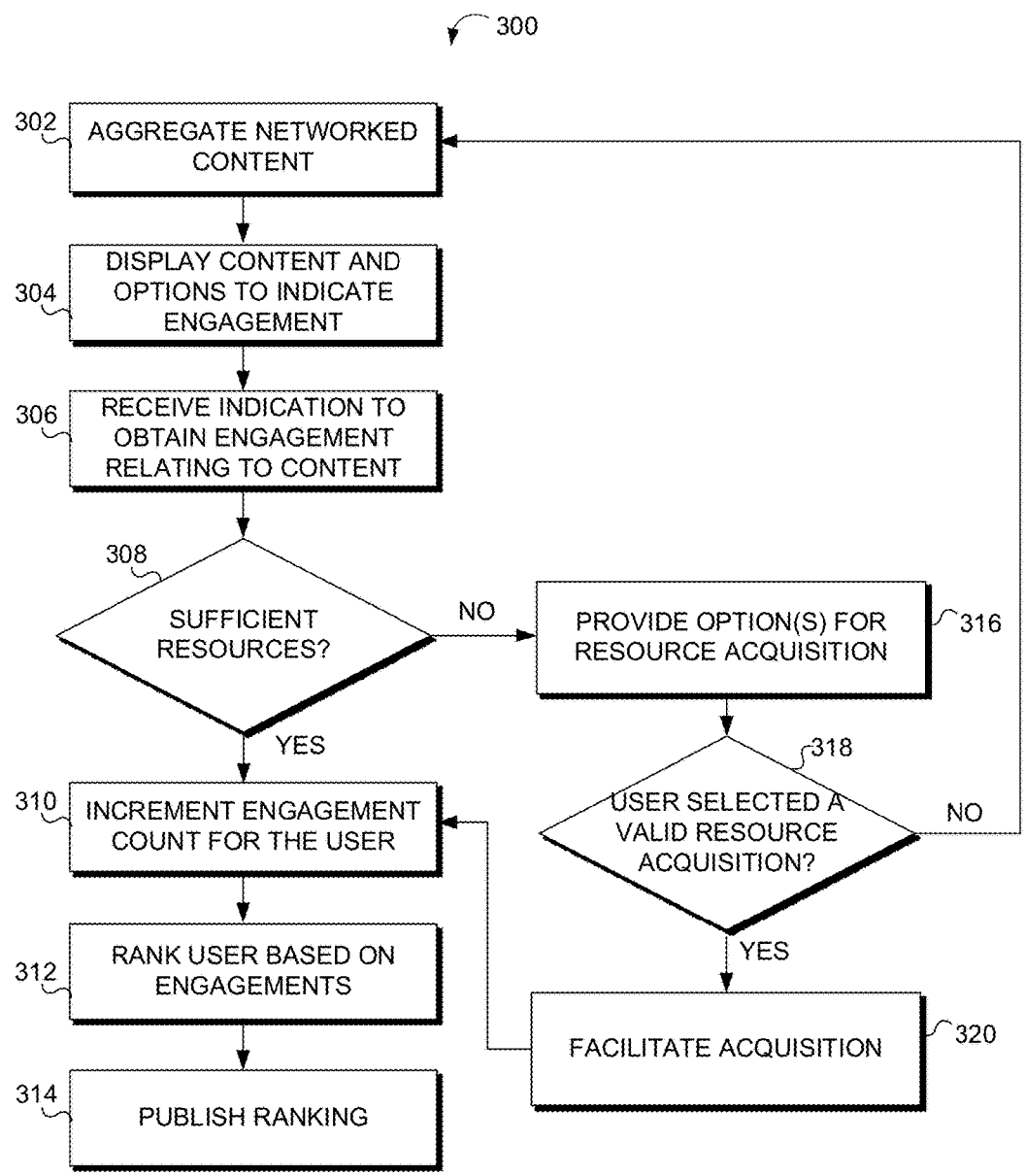
FIG. 3 depicts a process of aggregating networked social content and facilitating uncapped engagement in a networked virtual environment, according to an implementation of the invention.

FIG. 3 depicts a process 300 of aggregating networked social content and facilitating uncapped engagement in a networked virtual environment, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, process 300 may include aggregating networked content. For example, process 300 may include obtaining content from a system-provided content platforms, such as system-provided social platforms. In some instances, process 300 may include obtaining content from third party platforms, such as third party social media platforms. In these instances, process 300 may include generating and providing requests to third party social media platforms to obtain content posted in association with a user account. The user account may belong to a user, such as a celebrity or other user, and the content may relate to social media content posted by (or on behalf of) the celebrity. In this example, other users of the system may obtain engagements relating to content posted by the celebrity in order to get noticed by the celebrity, as set forth herein.

Whether system-provided or third party-provided (or both), in an operation 304, process 300 may include displaying the aggregated content and options to indicate engagement. Such options may include a single engagement option, a multi engagement option, an objective-based engagement option, a maximum available engagement option, a collaboration engagement option, an algorithmic engagement option, a donation engagement option, and/or other engagement options to opt to engage.

In an operation 306, process 300 may include receiving an indication to obtain an engagement relating to the content. For example, the user may select an option to obtain an engagement. As used herein, a selection of an option may include, without limitation, a click, a gesture, a contact on a touch screen, a voice input, and/or other type of input that can indicate a selection of an option displayed via a user interface.

In an operation 308, process 300 may include determining whether the user has sufficient resources to obtain the indicated engagement. For example, an engagement may require a certain number or amount of resources to obtain. The number or amount of resources may be specified (either in advance or in real-time as the content is created) by a system administrator, a user to which the content relates, and/or others.

In an operation 310, responsive to a determination that the user has sufficient resources, process 300 may include incrementing an engagement count for the user based on the indicated engagement. Operation 310 may also include decrementing the user resources for the engagement from a user account of resources associated with the user.

In an operation 312, process 300 may include ranking the user based on the number of engagements. The ranking may be based on number of engagement by a user for the specific content, a ranking based on number of engagements for a specific application (e.g., for entity-specific applications, the ranking may be based on overall number of engagements for content provided through an entity-specific application), a ranking based on overall number of engagements by the user with respect to the system, and/or other ranking relating to number of engagements by the user versus other users.

In an operation 314, process 300 may include publishing the rank. For example, process 300 may include displaying the rank alongside the content so that the user and others (namely, a celebrity user or other user that posted the content) may notice the top N users with the most engagements relating to the content.

Returning to operation 308, responsive to a determination that the user does not have sufficient resources for the indicated engagement, in an operation 316, process 300 may include providing options for resource acquisition. Such options may include, without limitation: acquiring resources in exchange for real currency and/or other types of resources; acquiring resources by requesting another user provide a portion or all of the required resources; acquiring resources by another user provide a portion or all of the real currency or other type of resources required to obtain the required resources; and/or other options to validly acquire the required resources.

In an operation 318, process 300 may include determining whether the user has selected a valid resource acquisition option. A valid resource acquisition option is one in which the required resources may be obtained (e.g., when sufficient real currency or other resources have been or can be obtained).

In an operation 320, responsive to a determination that the user has selected a valid resource acquisition option, process 300 may include facilitating the acquisition. On the other hand, responsive to a determination that the user has not selected a valid resource acquisition option, process 300 may return to operation 302. In some instances, process 300 may provide a notification to the user that the user has not selected a valid resource acquisition option.

Figure 4:
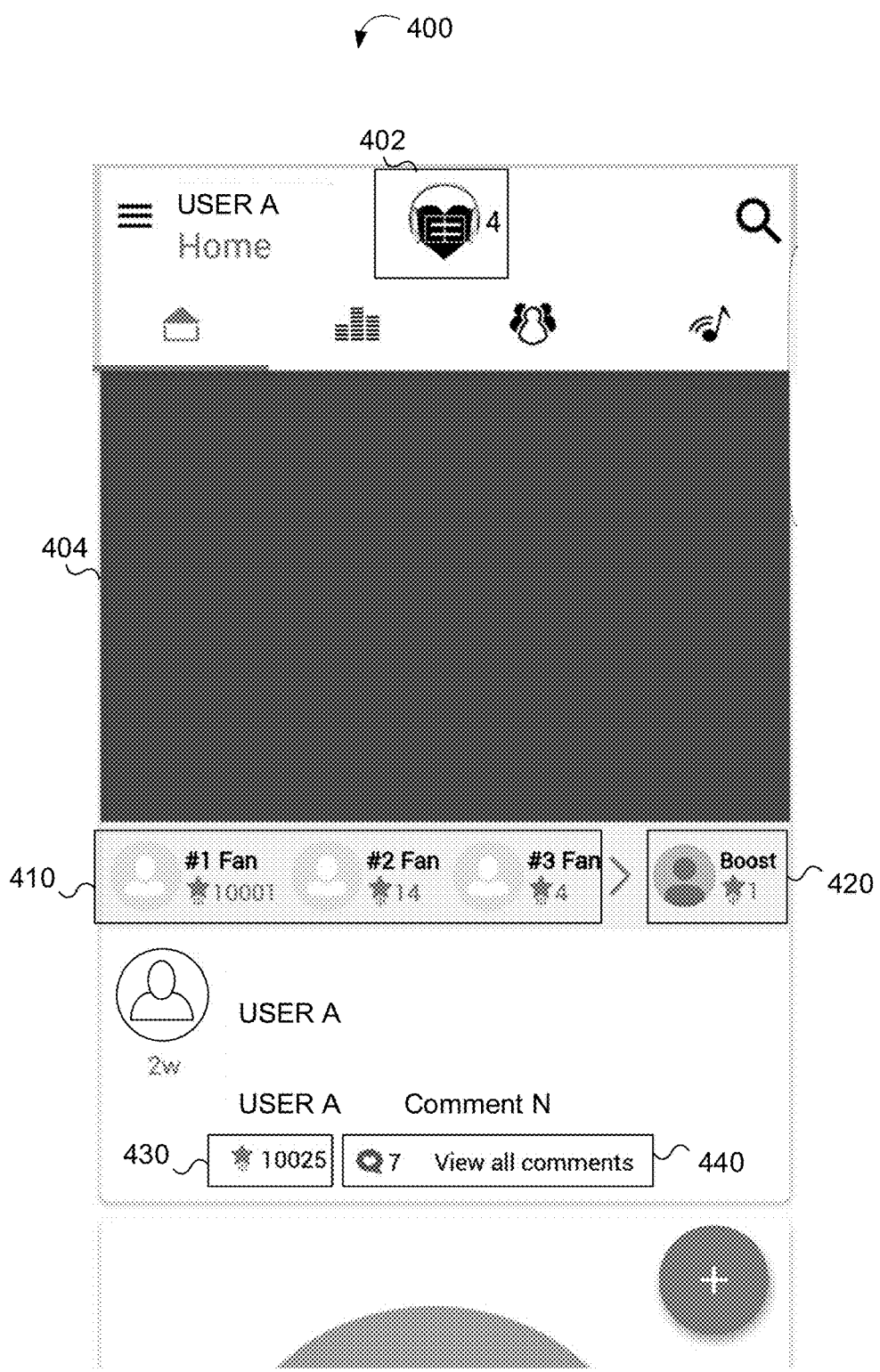
FIG. 4 depicts a screenshot of a user interface for uncapped engagement in a networked virtual environment, according to an implementation of the invention.

FIG. 4 depicts a screenshot of a user interface 400 for uncapped engagement in a networked virtual environment, according to an implementation of the invention. The screenshot illustrated in FIG. 4 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting. Furthermore, as would be appreciated, the various components of the illustrated interfaces may cause certain commands to be performed at or data provided to an application executing at a user device and/or to remote devices such as a computer system 110. In the illustrated screenshots, like other Figures, like references will be understood to refer to the same element.

In an implementation, as illustrated, UI 400 may include a resource quantity indicator 402, a content portion 404, an engagement ranking 410, an option to initiate obtaining an engagement 420, an indication of the number of engagements 430, an option to view comments 440 relating to posted content, and/or other features.

Resource quantity indicator 402 may display a number of resources available to a user for obtaining engagements (and other uses of the resources). As used herein throughout, although the term "number" of resources or "number" of engagements is used, resources and engagements may be quantified in ways other than a "number."

Content portion 404 may display content that is posted by a user, such as a celebrity or another user whose attention that other users wish to obtain through engagements.

Engagement ranking 410 may display the ranking of users based on the number of engagements they have obtained with respect to the content. As illustrated, an obtained engagement is illustrated as a star, although other graphical indicia may be used to represent an engagement as well.

An option to initiate obtaining an engagement 420 may, when selected, cause UI 500 (illustrated in FIG. 5) to be displayed.

Indication of the number of engagements 430 may display a number of engagements by all users relating to the content displayed in content portion 404.

Option to view comments 440 relating to posted content may, when selected, cause UI 600 (illustrated in FIG. 5) to be displayed. In some implementations, all comments may be displayed in UI 400 and/or UI 500 as well.

Figure 5:
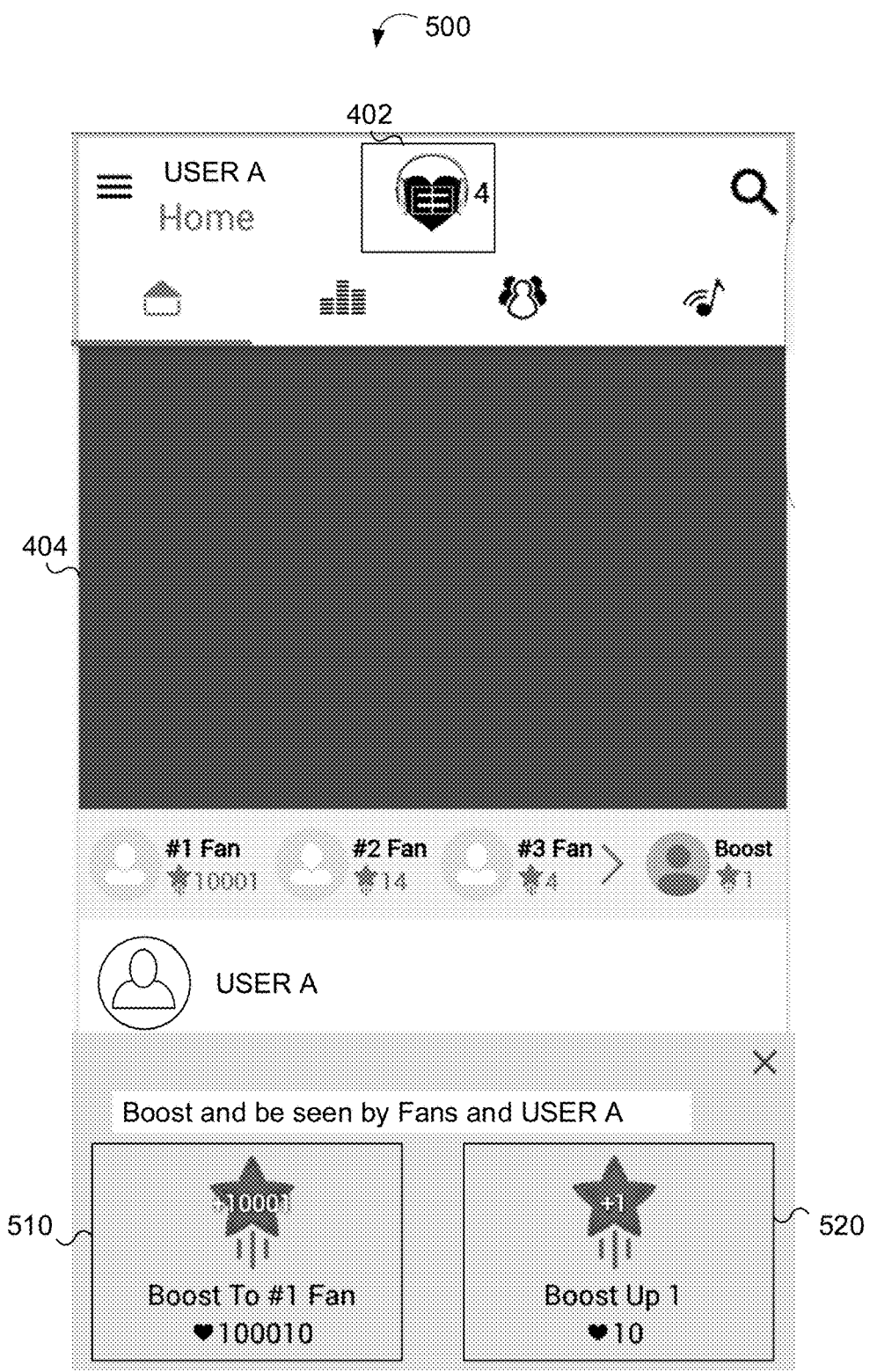
FIG. 5 depicts a screenshot of a user interface for uncapped engagement in a networked virtual environment, according to an implementation of the invention.

FIG. 5 depicts a screenshot of a user interface 500 for uncapped engagement in a networked virtual environment, according to an implementation of the invention. UI 500 may include options to obtain engagements. For example, option 510 is an objective-based engagement option that, as illustrated, when selected causes a number of engagements to be obtained by the user that results in the user being the top ranked user. For example, if the user must obtain 1000 engagements to be the number one (or other top N) user, option 510, when selected, may cause the user to obtain 1000 engagements. Option 520 is an example of a single engagement option. Option 520, when selected, causes a single engagement to be obtained by the user. Other types and numbers of engagement options may be provided as well.

If a user does not have sufficient resources to obtain the engagements specified by options 510, 520, or other engagement option, UI 500 may prompt the user to acquire additional resources.

Figure 6:
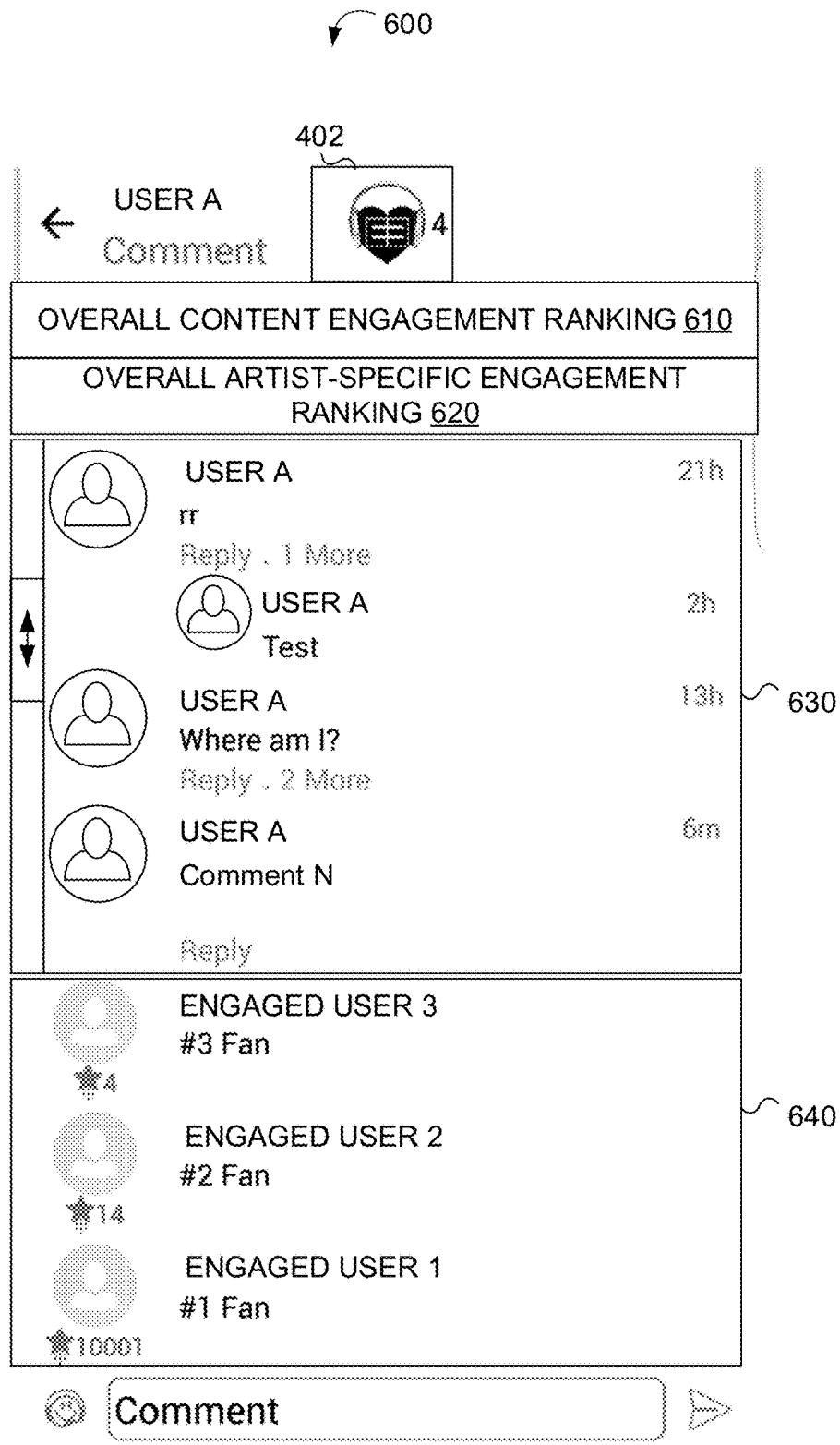
FIG. 6 depicts a screenshot of a user interface for uncapped engagement in a networked virtual environment, according to an implementation of the invention.

FIG. 6 depicts a screenshot of a user interface 600 for uncapped engagement in a networked virtual environment, according to an implementation of the invention. UI 600 may display comments relating to content in portion 630, which may be scrollable to reveal comments that may be off-screen. It should be noted that comments (including replies to comments) displayed in portion 630 may be individually engaged with as well. For instance, users may obtain engagements relating to comments in a manner similar to the way in which users may obtained engagements relating to content as described herein. In these instances, the number of resources to obtain an engagement relating to comments may be the same as or different from the number of resources to obtain an engagement relating to content. Alternatively or additionally, the type of resources to obtain an engagement relating to comments may be the same as or different from the type of resources to obtain an engagement relating to content As illustrated, UI 600 may include an overall content engagement ranking portion 610, which persistently displays engagement rankings of users relating to the content. Portion 610 is similar to portion 410 illustrated in FIG. 4. Overall application specific engagement ranking 620 may display an overall engagement ranking for an application. For example, this ranking may display a historical ranking of all engagements for a given application (e.g., an entity-specific application) that displays the content and any comments for the content. In this manner, a user who has historically obtained the most engagements but has not recently obtained engagements on current content may continue to be noticed by other users. This portion may alternatively or additionally display the historically the most engagements within that past N posts. Other types of metrics may be displayed as well, such as trends in which users who are recently (e.g., within the past N posts, where "N" as used throughout refers to a number) obtaining the most engagements. In this manner, recent top N ranked users with respect to engagement may be persistently displayed.

Portion 640 may persistently display any comments from the top N users displayed in portion 610. In this manner, the top ranked users based on their numbers of engagements, may have their comments persistently displayed. As used herein, "persistently displayed" and similar terminology refers to not being scrollable. For example, while portion 630 may be scrolled up and down, portions 610, 620, and 640 may not be scrolled so that they are persistently displayed.

Although illustrated in FIG. 1 as a single component, computer system 110 and end user device 120 may each include a plurality of individual components (e.g., computer devices) each programmed with at least some of the functions described herein. In this manner, some components of computer system 110 and/or end user device 120 may perform some functions while other components may perform other functions, as would be appreciated. Each of the computer system 110 and end user device 120 may include one or more physical processors that are programmed by computer program instructions, such as engagement module 210. Each of the computer system 110 and end user device 120 may include a storage device configured to store the engagement module 210 and/or other information. Computer system 110 may be configured as one or more networked servers and/or other computer systems that can communicate with various user devices 120. A user device 120 may be configured as a personal computer, a laptop computer, a tablet computer, a "smartphone," a multi-media player device, and/or other type of device that can display aggregated content and facilitate engagements as described herein.

Furthermore, in some implementations, engagement module 210 (or portions thereof) may be incorporated within third party social media platform(s) 150. In some implementations, engagement module 210 (or portions thereof) may be made available to third party social media platform(s) 150 via calls to computer system 110, which may host engagement module 210 (or portions thereof). In these implementations, computer system 110 may provide the functions of engagement module 210 through, for example, an Application Programming Interface, a web service, and/or other type of networked service so that third party social media platform(s) 150 may integrate the functions provided by engagement module 210 through remote networked requests to computer system 110.

The various instructions described herein are exemplary only. Other configurations and numbers of instructions may be used, so long as the processor(s) are programmed to perform the functions described herein. Furthermore, it should be appreciated that although the various instructions are illustrated in FIG. 1 as being co-located within a single processing unit, in implementations in which processor(s) includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) may be programmed by one or more additional instructions that may perform some or all of the functionality attributed herein to one of the instructions.

The various instructions described herein may be stored in a storage device, which may comprise random access memory (RAM), read only memory (ROM), and/or other memory. The storage device may store the computer program instructions (e.g., the aforementioned instructions) to be executed by a processor as well as data that may be manipulated by the processor. The storage device may comprise floppy disks, hard disks, optical disks, tapes, or other storage media for storing computer-executable instructions and/or data.

The various databases 130 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for aggregating content and facilitating uncapped engagement of the content, the system comprising:
   a computer system comprising one or more physical processors programmed by computer program instructions to:
   obtain a networked content item authored by a user;
   generate a user interface that displays a first number of engagements with the networked content item obtained by a first user, a second number of engagements with the networked content item obtained by a second user, and a display option configured to receive a request to obtain a number of engagements with respect to the networked content item, wherein a single engagement requires an amount of resources and the first number of engagements was obtained in exchange for a first amount of resource from the first user, and the second number of engagement was obtained in exchange for a second amount of resources from the second user;
   provide, via a network, the user interface;
   receive, via the user interface, an indication to obtain a third number of engagements relating to the networked content item from a third user different from the user that authored the networked content item, the first user, and the second user;
   determine a third amount of resources required to obtain the third number of engagements by multiplying the amount of resources required for a single engagement with the third number;
   debit the third amount of resources from a user account balance associated with the third user;
   store, in a database accessible to the computer system, an association between the third number of engagements and the third user; and
   provide, in the user interface, an indication of the third number of engagements.

2. The system of claim 1, wherein to obtain the networked content item, the computer system is further programmed to:
   obtain a social media content item authored by the first user.

3. The system of claim 2, wherein to obtain the social media content item, the computer system is further programmed to:
   aggregate a plurality of social media content items, authored by the user, from one or more third party social media platforms, wherein the plurality of social media content items includes the social media content item.

4. The system of claim 1, wherein the computer system is further programmed to:
obtain a level of user activity by the third user with an application executing at a remote user device, the application displaying the user interface;
determine an amount of resources to award the first user based on the level of user activity; and
increment the user account balance based on the amount of resources.

5. The system of claim 1, the computer system is further programmed to:
receive a request to obtain additional resources used to exchange for engagements;
determine a fiat currency amount required to obtain the third amount of resources;
cause a financial account to be debited based on the fiat currency amount; and
increment the user account balance based on the requested additional resources.

6. The system of claim 1, wherein the computer system is further programmed to:
rank the first user with respect to the second user based on the first number of engagements and the second number of engagements; and
display, in the user interface, an indication of the rank.

7. The system of claim 6, wherein the computer system is further programmed to:
determine a number of engagements with respect to the networked content item required to achieve a certain rank, wherein the certain rank is associated with a certain number of engagements with respect to the networked content item relative to other numbers of engagements from other users; and
provide, in the user interface, an option to obtain the determined number of engagements to achieve the certain rank.

8. The system of claim 7, wherein the certain rank comprises a top rank, and wherein the number of engagements with respect to the networked content item required to achieve the certain rank comprises a highest number of engagements with respect to the networked content item relative to other numbers of engagements from other users.

9. The system of claim 8, wherein the computer system is further programmed to:
determine an amount of resources required to obtain the required number of engagements to achieve the top rank;
determine that an available balance of resources in the user account balance associated with the third user is less than the amount of resources required to obtain the required number of engagements to achieve the top rank; and
provide, in the user interface, an option to obtain additional resources.

10. The system of claim 7, wherein computer system is further programmed to:
obtain an instruction to maintain the certain rank, wherein the instruction causes the certain number of engagements to be obtained on behalf of the third user without intervention by the third user and without respect to whether or not a user device used by the third user is connected to a network.

11. A system for aggregating content and facilitating uncapped engagement of the content, the system comprising:
a computer system comprising one or more physical processors programmed by computer program instructions to:
obtain a networked content item authored by a user;
generate a user interface comprising the networked content item and a display option configured to receive a request to obtain engagements with respect to the networked content item;
provide, via a network, the user interface;
receive, via the user interface, an indication to obtain a first plurality of engagements relating to the networked content item from a first user different from the user that authored the networked content item, wherein the indication to obtain the first plurality of engagements comprises an indication to obtain the first plurality of engagements together with at least a third user, different from the user, the first user, and the second user
determine an amount of resources required to obtain the first plurality of engagements;
debit the amount of resources from a user account balance associated with the first user and/or from another user account balance associated with the third user, wherein the user account balance stores an amount of resources available to the first user;
store, in a database accessible to the computer system, an association between the first plurality of engagements and the first user;
obtain, from the database, information indicating a second plurality of engagements with respect to the networked content item from at least a second user different from both the user and the first user; and
provide, via the user interface, an indication of the first plurality of engagements from the first user and the second plurality of engagements from the second user.

12. A system for aggregating content and facilitating uncapped engagement of the content, the system comprising:
a computer system comprising one or more physical processors programmed by computer program instructions to:
obtain a networked content item authored by a user;
generate a user interface comprising the networked content item and a display option configured to receive a request to obtain engagements with respect to the networked content item;
provide, via a network, the user interface;
receive, via the user interface, an indication to obtain a first plurality of engagements relating to the networked content item from a first user different from the user that authored the networked content item;
determine an amount of resources required to obtain the first plurality of engagements;
debit the amount of resources from a user account balance associated with the first user, wherein the user account balance stores an amount of resources available to the first user;
store, in a database accessible to the computer system, an association between the first plurality of engagements and the first user;
obtain, from the database, information indicating a second plurality of engagements with respect to the networked content item from at least a second user different from both the user and the first user; and provide, via the user interface, an indication of the first plurality of engagements from the first user and the second plurality of engagements from the second user;

obtain a request from at least a third user to donate an amount of resources from a second user account balance associated with the third user to the user account balance; and increment the user account balance based on the request from the third user to donate the amount of resources from the second user account balance.

13. A method for aggregating content and facilitating uncapped engagement of the content, the method being implemented on a computer system comprising one or more physical processors programmed by computer program instructions to perform the method, the method comprising:

obtaining, by the computer system, a networked content item authored by a user;

generating, by the computer system, a user interface that displays a first number of engagements with the networked content item obtained by a first user, a second number of engagements with the networked content item obtained by a second user, and a display option configured to receive a request to obtain a number of engagements with respect to the networked content item, wherein a single engagement requires an amount of resources and the first number of engagements was obtained in exchange for a first amount of resources from the first user, and the second number of engagement was obtained in exchange for a second amount of resources from the second user;

providing, by the computer system, via a network, the user interface;

receiving, by the computer system, via the user interface, an indication to obtain a third number of engagements relating to the networked content item from a third user different from the user that authored the networked content item, the first user, and the second user;

determining, by the computer system, a third amount of resources required to obtain the third number of engagements by multiplying the amount of resources required for a single engagement with the third number;

debiting, by the computer system, the third amount of resources from a user account balance associated with the third user;

storing, by the computer system, in a database accessible to the computer system, an association between the third number of engagements and the third user; and providing, by the computer system, in the user interface, an indication of the third number of engagements.

14. The method of claim 13, wherein obtaining the networked content item comprises:

obtaining, by the computer system, a social media content item authored by the first user.

15. The method of claim 14, wherein obtaining the social media content item comprises:

aggregating, by the computer system, a plurality of social media content items, authored by the user, from one or more third party social media platforms, wherein the plurality of social media content items includes the social media content item.

16. The method of claim 13, the method further comprising:

obtaining, by the computer system, a level of user activity by the third user with an application executing at a remote user device, the application displaying the user interface;

determining, by the computer system, an amount of resources to award the first user based on the level of user activity; and incrementing, by the computer system, the user account balance based on the amount of resources.

17. The method of claim 13, the method further comprising:

receiving, by the computer system, a request to obtain additional resources used to exchange for engagements determining, by the computer system, a fiat currency amount required to obtain the determine amount of resources;

causing, by the computer system, a financial account to be debited based on the fiat currency amount; and incrementing, by the computer system, the user account balance based on the requested additional resources.

18. The method of claim 13, the method further comprising:

ranking, by the computer system, the first user with respect to the second user based on the first number of engagements and the second number of engagements; and display, by the computer system, in the user interface, an indication of the rank.

19. The method of claim 18, the method further comprising:

determining, by the computer system, a number of engagements with respect to the networked content item required to achieve a certain rank, wherein the certain rank is associated with a certain number of engagements with respect to the networked content item relative to other numbers of engagements from other users; and providing, by the computer system, in the user interface, an option to obtain the determined number of engagements to achieve the certain rank.

20. The method of claim 19, wherein the certain rank comprises a top rank, and wherein the number of engagements with respect to the networked content item required to achieve the certain rank comprises a highest number of engagements with respect to the networked content item relative to other numbers of engagements from other users.

21. The method of claim 20, the method further comprising:

determining, by the computer system, an amount of resources required to obtain the required number of engagements to achieve the top rank;

determining, by the computer system, that an available balance of resources in the user account balance associated with the third user is less than the amount of resources required to obtain the required number of engagements to achieve the top rank; and providing, by the computer system, in the user interface, an option to obtain additional resources.

22. The method of claim 19, the method further comprising:

obtaining, by the computer system, an instruction to maintain the certain rank, wherein the instruction causes the certain number of engagements to be obtained on behalf of the first user without intervention by the first user and without respect to whether or not a user device used by the first user is connected to a network.

23. A method for aggregating content and facilitating uncapped engagement of the content, the method being implemented on a computer system comprising one or more physical processors programmed by computer program instructions to perform the method, the method comprising:

obtaining, by the computer system, a networked content item authored by a user;

generating, by the computer system, a user interface comprising the networked content item and a display option configured to receive a request to obtain engagements with respect to the networked content item;

providing, by the computer system, via a network, the user interface;

receiving, by the computer system, via the user interface, an indication to obtain a first plurality of engagements relating to the networked content item from a first user different from the user that authored the networked content item, wherein the indication to obtain the first plurality of engagements comprises an indication to obtain the first plurality of engagements together with at least a third user, different from the user, the first user, and the second user;

determining, by the computer system, an amount of resources required to obtain the first plurality of engagements;

debiting, by the computer system, the amount of resources from a user account balance associated with the first user and/or from another user account balance associated with the third user, wherein the user account balance stores an amount of resources available to the first user;

storing, by the computer system, in a database accessible to the computer system, an association between the first plurality of engagements and the first user;

obtaining, by the computer system, from the database, information indicating a second plurality of engagements with respect to the networked content item from at least a second user different from both the user and the first user; and providing, by the computer system, via the user interface, an indication of the first plurality of engagements from the first user and the second plurality of engagements from the second user.

24. A method for aggregating content and facilitating uncapped engagement of the content, the method being implemented on a computer system comprising one or more physical processors programmed by computer program instructions to perform the method, the method comprising:

obtaining, by the computer system, a networked content item authored by a user;

generating, by the computer system, a user interface comprising the networked content item and a display option configured to receive a request to obtain engagements with respect to the networked content item;

providing, by the computer system, via a network, the user interface;

receiving, by the computer system, via the user interface, an indication to obtain a first plurality of engagements relating to the networked content item from a first user different from the user that authored the networked content item;

determining, by the computer system, an amount of resources required to obtain the first plurality of engagements;

debiting, by the computer system, the amount of resources from a user account balance associated with the first user, wherein the user account balance stores an amount of resources available to the first user;

storing, by the computer system, in a database accessible to the computer system, an association between the first plurality of engagements and the first user;

obtaining, by the computer system, from the database, information indicating a second plurality of engagements with respect to the networked content item from at least a second user different from both the user and the first user;

providing, by the computer system, via the user interface, an indication of the first plurality of engagements from the first user and the second plurality of engagements from the second user; and obtaining, by the computer system, a request from at least a third user to donate an amount of resources from a second user account balance associated with the third user to the user account balance; and incrementing, by the computer system, the user account balance based on the request from the third user to donate the amount of resources from the second user account balance.

* * * * *